United States Patent [19]

Treybig et al.

[11] Patent Number: 4,543,388

[45] Date of Patent: Sep. 24, 1985

[54] THERMOSETTABLE POLYMERS OR PREPOLYMERS PREPARED FROM POLYMETHYLATED PYRAZINES AND AROMATIC POLYALDEHYDES AND CURED PRODUCTS THEREFROM

[75] Inventors: Duane S. Treybig, Lake Jackson; Loren L. Swearingen, Clute, both of Tex.

[73] Assignee: The Dow Chemical Company, Midland, Mich.

[21] Appl. No.: 670,428

[22] Filed: Nov. 9, 1984

Related U.S. Application Data

[63] Continuation-in-part of Ser. No. 611,244, May 17, 1984, abandoned.

[51] Int. Cl.$^4$ .............................................. C08G 16/02
[52] U.S. Cl. ...................................... 524/597; 524/10; 524/12; 524/13; 524/14; 524/33; 524/702; 524/877; 525/417; 525/428; 528/252; 528/270

[58] Field of Search ................... 528/252, 270; 524/10, 524/12, 13, 14, 33, 597, 702, 877; 525/417, 428

[56] References Cited

U.S. PATENT DOCUMENTS 3,562,223  2/1971  Bargain et al. ......................... 260/78

Primary Examiner—Maurice J. Welsh
Attorney, Agent, or Firm—J. G. Carter

[57] ABSTRACT

Thermosettable prepolymers or resins are prepared by reacting a pyrazine containing at least two substituent groups which have a hydrogen atom attached to a carbon atom which is attached to the ring with a material containing at least two aromatic aldehyde groups. These prepolymers or resins are curable to thermoset products having good mechanical and thermal properties. Thermoset polymers having good mechanical and thermal properties are also prepared by homopolymerization in the presence of N,N'-bis-imides or copolymerization of these prepolymers with N,N'-bis-imides. The prepolymers are suitable for preparing composites.

183 Claims, No Drawings

THERMOSETTABLE POLYMERS OR PREPOLYMERS PREPARED FROM POLYMETHYLATED PYRAZINES AND AROMATIC POLYALDEHYDES AND CURED PRODUCTS THEREFROM

CROSS REFERENCE TO RELATED APPLICATION

This application is a continuation-in-part of copending application Ser. No. 611,244 filed May 17, 1984 and now abandoned.

BACKGROUND OF THE INVENTION

The present invention pertains to polymers prepared from polymethylated pyrazines and aromatic polyaldehydes and cured products prepared therefrom.

The present invention provides thermosettable polymers or prepolymers which provide cured thermoset products which have good thermal properties as well as good physical properties. Thermoset products with good thermal as well as good physical properties can also be obtained by homopolymerization in the presence of N,N'-bis-imides or copolymerization of these prepolymers with N,N'-bis-imides. Composites can be prepared by impregnating reinforcing materials such as glass or graphite fibers with the prepolymer.

SUMMARY OF THE INVENTION

One aspect of the present invention pertains to a thermosettable product which results from reacting
(A) a pyrazine compound having at least two substituent groups which have at least one hydrogen atom attached to a carbon atom which is attached to the ring or mixture of such pyrazines and
(B) at least one material having at least two aldehyde groups wherein components (A) and (B) are employed in quantities which provide a mole ratio of (A) to (B) of from about 0.25:1 to about 4:1, preferably from about 1:1 to about 1.5:1.

Another aspect of the present invention pertains to the products resulting from curing the aforementioned thermosettable reaction product by heat and pressure or by homopolymerization in the presence of N,N'-bis-imides or copolymerization with a N,N'-bis-imide.

DETAILED DESCRIPTION OF THE PREFERRED INVENTION

Suitable pyrazines which can be employed herein include any pyrazine which has at least two substituent groups which have at least one hydrogen atom attached to a carbon atom which is attached to the ring. Particularly suitable pyrazines include, di- and trialkyl pyrazines such as, for example, 2,5-dimethylpyrazine, 2,6-dimethylpyrazine, 2,3-dimethylpyrazine, 2,6-diamino-3,5-dimethylpyrazine, 3,5-dicyano-2,6-dimethylpyrazine, 2,3,5-trimethylpyrazine, 6-nitro-2,3,5-trimethylpyrazine, 2-chloro-3,5,6-trimethylpyrazine, 2,3,5,6-tetramethylpyrazine, 2,5-diethylpyrazine, 2,5-dipropylpyrazine, 2,6-diethylpyrazine, 2,6-dipropylpyrazine, 2,3-diethylpyrazine, 2,3-dipropylpyrazine, 2,3,5-triethylpyrazine, 2,3,5-tripropylpyrazine, mixtures thereof and the like. 2-Methylpyrazine can be mixed or blended with pyrazine having two or more methyl groups to control the molecular weight of the prepolymer.

Other aromatic nitrogen containing heterocycles such as pyrazole, pyridazine, pyrimidines, purines, pteridines, imidazole, triazines, quinoline and quinoxalines having two or more substituents which have at least one hydrogen atom attached to a carbon atom which is attached to the ring can be substituted for the pyrazines having such substituents. Suitable pyrazoles include 3,5-dimethylpyrazole, 1-ethyl-3,5-dimethylpyrazole and 3,4,5-trimethylpyrazole. Suitable pyridazines include 3,5-dimethylpyridazine, 4-chloro-3,5-dimethylpyridazine and 3,4,5-trimethylpyridazine. Suitable pyrimidines include 2,4-dimethylpyrimidine, 4,5-dimethylpyrimidine, 4,6-dimethylpyrimidine, 2,6-dimethyl-4-aminopyrimidine and 2,4,6-trimethylpyrimidine. Suitable purines include 2,8-dimethylpurine, 2,8-dimethyl-6-aminopurine, and 2,6,8-trimethylpurine. Suitable pteridines include 6,7-dimethylpteridine, 2,6-dimethylpteridine, 2,4,7-trimethylpteridine, and 2,4,6,7-tetramethylpteridine. Suitable imidazoles include 2,5-dimethylimidazole, 2,4-dimethylimidazole and 2,4,5-trimethylimidazole. Suitable triazines include 3,5-dimethyl-1,2,4-triazine, 3,6-dimethyl-1,2,4-triazine, 2,6-dimethyl-1,3,5-triazine and 2,4,6-trimethyl-1,3,5-triazine. Suitable quinolines include 2,6-dimethylquinoline, 2,7-dimethylquinoline, 2,4-dimethylquinoline, 2,3,6-trimethylquinoline and 2,3,6,7-tetramethylquinoline. Suitable quinoxalines include 2,5-dimethylquinoxaline, 2,3-dimethylquinoxaline, 2,6-dimethylquinoxaline, 2,3,7-trimethylquinoxaline and 2,3,6,8-tetramethylquinoxaline. Pyrazole, pyridazine, pyrimidine, purines, pteridines, imidazoles, triazines, quinolines and quinoxalines having two or more of such substituents can be mixed or blended with each other or pyrazine having two or more of such substituents. Also, pyridine having two or more of such substituents can be mixed or blended with pyrazine, pyrazole, pyridazine, pyrimidine, purines, pteridines, imidazoles, triazines, quinolines or quinoxalines having two or more of such substituents or their mixtures.

Molecular weight control of the polymer can be obtained by the addition of an aromatic nitrogen containing heterocycle having one substituent which has at least one hydrogen atom attached to a carbon atom which is attached to the ring as a chain terminator to an aromatic nitrogen containing heterocycle having two or more substituents which have at least one hydrogen atom attached to a carbon atoms which is attached to the ring. For example, pyrazine, pyridine, pyrazole, pyridazine, pyrimidine, purines, pteridines, imidazoles, triazines, quinolines, or quinoxalines or a mixture of any two or more such compounds having at least one such substituent can be blended or mixed with those having more than one such substituent.

Suitable aldehydes which can be employed herein include any aldehydes which contain at least two aldehyde groups and no other substituent groups which would tend to interface with the reaction of the aldehyde groups and the said substituent groups of the pyrazine material. Particularly suitable aldehyde materials include, for example, those of the formula:

 (1)

wherein n=2 or more, and R is an aromatic groups such as, for example,

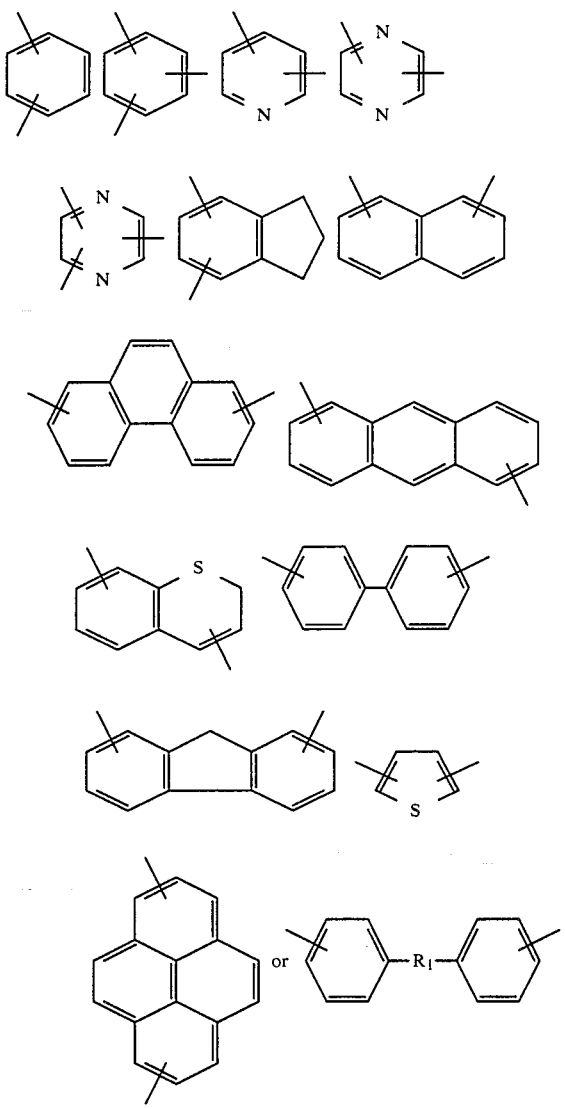

where $R_1$ is alkylene, oxygen, sulfur, oxyalkylene, polyoxyalkylene,

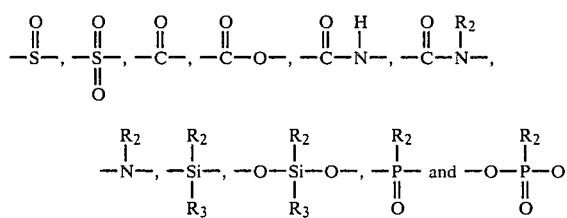

wherein $R_2$ and $R_3$ are alkyl, aryl or aralkyl, and substituted groups thereof.

Particularly suitable aldehydes include, for example, terephthaldicarboxaldehyde, o-phthalicdicarboxaldehyde, isophthalaldehyde, glyoxal, dicinnamylaldehyde, 2,5-pyrazinedicarboxaldehyde, 2,3,4,5-pyrazinetetracarboxaldehyde, 1,5-naphthalenedicarboxaldehyde, 1,2,4,5,7,8-naphthalenehexacarboxaldehyde, 1-bromo-2,5-naphthalenedicarboxaldehyde, 2-hydroxy-1,5-naphthalenedicarboxaldehyde, 2,6-phenanthrenedicarboxaldehyde, 2,7-pyrenedicarboxaldehyde, 4-chloro-2H-thiochromene-3,7-dicarboxaldehyde, 2,6-fluorenedicarboxaldehyde, 10-chloro-3,8-anthracenedicarboxaldehyde, 3,7-quinolinedicarboxaldehyde, 4,4'-bisbenzene-1-carboxaldehyde, 4,4'-oxy-bisbenzene-1-carboxaldehyde, 4,4'-(2,1-ethanediylbisoxy)-benzene-1-carboxyaldehyde, 4,4'-sulfonylbisbenzene-1-carboxaldehyde, 4,4'-methylenebisbenzene-1-carboxaldehyde, and mixtures thereof.

Monoaldehydes such as benzaldehyde, o-tolualdehyde, trans-cinnamaldehyde, 3-chlorobenzaldehyde or p-anisaldehyde can be mixed or blended with a dialdehyde or mixture of dialdehydes to control the molecular weight of the prepolymer.

Pyrazine, pyrazole, pyridazine, pyrimidine, pyridine, purines, pteridines, imidazole, triazines, quinoline, and quinoxalines or mixtures thereof containing both a substituent having at least one hydrogen atom attached to a carbon atom which is attached to the ring and an aldehyde substituent can be reacted with itself. For example, suitable pyrazines containing both a substituent having at least one hydrogen atom attached to a carbon atom which is attached to the ring and an aldehyde substituent include 2-methyl-5-pyrazinecarboxaldehyde, 2-methyl-6-pyrazinecarboxaldehyde, 2-methyl-3,5-pyrazinedicarboxaldehyde, 2,3-dimethyl-5-pyrazinecarboxaldehyde and 2,3-dimethyl-5,6-pyrazinedicarboxaldehyde.

The reaction can be conducted in the absence or presence of suitable catalysts such as, for example, acids, Lewis acids, bases or salts. Particularly suitable acids include, for example, sulfuric, hydrochloric or p-toluene-sulfonic acid. Particularly suitable bases include, for example, hydroxides of alkali or alkaline earth metals or of quaternary ammonium. Particularly suitable Lewis acids include, for example, boron trifluoride and the like. Particularly suitable salts include, for example, zinc chloride or aluminum chloride. The use of such catalysts is not indispensable but it reduces the time required for the reaction. The amount is e.g. of from about 0.1 to about 10 mole% with respect to the aromatic dialdehyde. If desirable, larger or lesser quantities can be employed.

The reaction can also be accelerated by certain substances such as methyl iodide, methyl sulfate, benzyl chloride etc., capable of forming with the pyrazinic base quaternary ammonium derivatives, such substances being usable in catalytic amounts or higher proportions.

Addition of a dehydrating agent such as acetic anhydride can also promote the reaction and its action can be sufficient to render superfluous the incorporation of a catalyst.

The reaction is usually conducted in an inert atmosphere such as, for example, nitrogen, helium, neon, zenon, argon, mixtures thereof and the like.

Volatile emission during cure can be limited by subjecting the thermosettable prepolymers or resins of the present invention to sublimation, distillation or solvent extraction to remove reactants, catalyst and solvents. Suitable solvents for extraction include, for example, ketones, alcohols, ethers, hydrocarbons, chlorinated solvents and the like. Particularly suitable solvents include acetone, methanol, ethanol, mixtures thereof and the like.

The thermosettable prepolymers or resins of the present invention can be cured as is with the application of heat and pressure, or they can be dissolved in a suitable solvent or mixture of solvents and employed to saturate various reinforcing materials so as to prepare composites therefrom through the application of heat and pressure.

Suitable solvents which can be employed for preparing these composites include, for example, ketones, acetates, alcohols, ethers, hydrocarbons and the like. Particularly suitable solvents include, for example, acetone, methylethylketone, ethyl acetate, methylene chloride, trichloroethylene, tetrahydrofuran, chlorobenzene, ethanol, n-propanol, N-methyl-pyrrolidinone, dimethylformamide, dimethylacetamide, nitrobenzene, mixtures thereof and the like.

Suitable reinforcing materials include, for example, glass fibers, aramid fibers, carbon or graphite fibers and the like in any form such as, for example, matt, woven or fibrous form. Any synthetic or natural fiber materials can be employed as the reinforcing material.

The thermosettable prepolymers can be used according to various conventional techniques applicable to thermosetting resins. Powdered prepolymers are especially adapted for shaping by pressure-molding, but they can also be dissolved in a solvent or be employed in molten form. They can be used in the preparation of laminates or composites, molded articles, films, coatings and the like.

The prepolymer is advantageously set by a thermal treatment at a temperature of from about 100° to about 300° C. Finally there is obtained a non-fusible and non-soluble polymer. Said polymer has a good thermal stability.

The prepolymer can be homopolymerized in the presence of a N,N'-bis-imide or copolymerized with a N,N'-bis-imide of the formula:

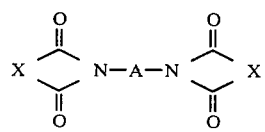

in which X represents a divalent radical containing a carbon-carbon double bond and A is a divalent radical having at least 2 carbon atoms. Preferred N,N'-bis-imides which may be employed, are maleic N,N'-ethylene-bis-imide, maleic N,N'-hexamethylene-bis-imide, maleic N,N'-metaphenylene bis-imide, maleic N,N'-paraphenylene-bis-imide, maleic N,N'-4,4'-diphenylmethane-bis-imide, maleic N,N'-4,4'-diphenylether-bis-imide, maleic N,N'-4,4'-diphenylsulfone-bis-imide, maleic N,N'-4,4'-dicyclohexylmethane-bis-imide, maleic N,N'-metaxylylene-bis-imide, and maleic N,N'-4,4'-diphenylcyclohexane-bis-imide.

The following examples are illustrative of the present invention, but are not to be construed as to limiting the scope thereof in any manner.

EXAMPLE 1

2,5-Dimethylpyrazine (100 g, 0.92 mole) and terephthaldicarboxaldehyde (104.9 g, 0.78 mole) were heated with stirring in a 500 ml reactor in a nitrogen atmosphere. Zinc chloride (2.67 g, 0.0196 mole) was added after complete dissolution which was apparent at 128° C. The temperature was maintained between 162°–186° C. The reaction was stopped after two hours (7200 s). The infrared spectrum of the brown resin showed a band of 970 cm$^{-1}$ which indicates the presence of trans unsaturation. Gel permeation chromatography indicated the weight average molecular weight of the N,N-dimethylformamide soluble portion of the prepolymer was 6200. The weight average molecular weight is based upon polystyrene standards. The resin was crushed and formed an orange powder. The powder was cured at <200° C. for 2 hours (7200 s) and 250° C. for 21 hours (76,500 s) under vacuum. Thermogravimetric analysis of the cured resin showed it lost 30–35 wt% at 940° C. in nitrogen, 5 wt% at 390° C. in air and 60 wt% at 700° C. in air. The cured product showed no apparent glass transition temperature (Tg) in differential scanning calorimetry (DSC) analyses up to 400° C.

EXAMPLE 2

2,3,5-Trimethylpyrazine (100 g, 0.82 mole) and terephthaldicarboxaldehyde (93.5 g, 0.70 mole) were heated with stirring in a 500 ml resin kettle in a nitrogen atmosphere. After complete dissolution which was apparent at 110° C., zinc chloride (2.37 g, 0.017 mole) was added to the reactor contents. The temperature was maintained between 133°–188° C. for 11 hours and 43 minutes (42,180 s). The infrared spectra of the dark brown solid indicated the presence of trans unsaturation. Gel permeation chromatography indicated the weight average molecular weight of the N,N-dimethylformamide soluble portion of the prepolymer was 7200. The resin was crushed forming a red-orange powder. The powder was cured at <200° C. for 4 hours (14,400 s) and 250° C. for 27 hours (97,200 s) in a vacuum oven. Thermogravimetric analysis of the cured resin showed it lost 5 wt% at 380° C. and 69 wt% at 700° C. in air. Differential scanning calorimetry suggested the cured product had no apparent glass transition temperature up to 400° C.

EXAMPLE 3

2,3,5,6-Tetramethylpyrazine (100 g, 0.73 mole) and terephthaldicarboxaldehyde (83.7 g, 0.62 mole) were heated with stirring in a 500 ml reactor in a nitrogen atmosphere. After complete dissolution at 80° C., zinc chloride (2.13 g, 0.16 mole) was added to the reactor contents. The reaction temperature was maintained between 166°–195° C. for 32 minutes (1920 s). The infrared spectra supported the presence of trans unsaturation. Gel permeation chromatography indicated the weight average molecular weight of the N,N-dimethylformamide soluble portion of the prepolymer was 5700. The resin was crushed to give a red powder with a mortar and pestle. The red powder was cured at <200° C. for 4 hours (14,400 s) and 250° C. for 27 hours (97,200 s) in a vacuum oven. Thermogravimetric analysis of the cured polystyrylpyrazine indicated it lost 5 wt% at 360° C. and 98 wt% at 700° C. in air. Differential scanning calorimetry suggested the cured product had no apparent glass transition temperature up to 400° C.

EXAMPLE 4

2,5-Dimethylpyrazine (597 g, 5.5 moles) and terephthaldicarboxaldehyde (629 g, 4.7 moles) were added to a 2 liter resin kettle equipped with a molecular sieve trap, immersion thermometer, mechanical stirrer, nitrogen purge system and Brookfield viscometer. A reflux condenser was attached to the molecular sieve trap. The molecular sieve trap was designed to trap water on molecular sieves but return 2,5-dimethylpyrazine and other organics back to the reactor. The reactor contents were heated with stirring. After complete dissolution, sulfuric acid (11.92 g, 0.122 mole) was added to the reactor contents. The temperature was maintained between 163°–176° C. After 7 hours and 46 minutes (27,960 s) the viscosity reached 758 centipoise. The reactor contents were cooled to room temperature resulting in a brown viscous liquid. The brown viscous liquid was stirred in methanol for an hour (3600 s). The methanolic solution of prepolymer was vacuum filtered using a sintered funnel of medium porosity. The prepolymer was washed with methanol, acetone and then dried in a vacuum oven between 80°–120° C. giving a yellow powder. The infrared spectra of the yellow powder showed a band at 970 cm$^{-1}$ which indicates the presence of trans unsaturation. The prepolymer exhibited a distinct softening point between 232°–240° C. The yellow prepolymer was compression molded between 250°–260° C. and 4300 psi (29648 kPa) for 2 hours (7200 s) with a Carver Laboratory press, employing a silicone mold release agent. Thermogravimetric analysis of the cured polymer in nitrogen showed 5% weight loss at 380° C. and 31% weight loss at 950° C. In air, the polymer lost 5% weight at 385° C. and 62% weight at 700° C. Differential scanning calorimetry indicated no glass transition temperature (Tg) was present up to 400° C. The compressed molded polymer was post cured at 270° C. for 24 hours (86,400 s). Thermogravimetric analysis in nitrogen showed 5% weight loss at 470° C. and 29% weight loss at 950° C. In air, the post cured polymer lost 5% weight at 460° C. and 58% weight loss at 700° C.

EXAMPLE 5

2,3,5,6-Tetramethylpyrazine (600 g, 4.4 moles) and terephthaldicarboxaldehyde (502 g, 3.7 moles) were added to a resin kettle of the type described in Example 4. After complete dissolution, sulfuric acid (9.78 g, 0.096 mole) was added to the reactor contents. The temperature was maintained between 174°–182° C. After 1 hour and 22 minutes (4920 s), the viscosity reached 3670 centipoise. A dark red, hard, glassy solid was obtained after the reactor contents were cooled to room temperature. The solid was crushed with a mortar and pestle to give a red powder. The powder was stirred in methanol for an hour (3600 s). The methanolic solution of prepolymer was vacuum filtered using a sintered funnel of medium porosity. The prepolymer was washed with methanol, acetone and then dried in a vacuum oven between 80°–120° C. giving an orange powder. The infrared spectra of the orange powder was consistent with the infrared spectra described in Example 4. The orange prepolymer had a broad softening point ranging from 190°–219° C. The prepolymer was compression molded between 250°–290° C. and 7000 psi (48264 kPa) for 2 hours (7200 s) with a Carver Laboratory press as described in Example 4. Thermogravimetric analysis of the cured polymer in nitrogen showed 5% weight loss at 460° C. and 39% weight loss at 950° C. The polymer lost 5% weight at 475° C. and 76% weight at 700° C. in air. Differential scanning calorimetry revealed no apparent glass transition temperature up to 400° C. Dynamic mechanical analyses showed no glass transition temperature up to 400° C., a gamma transition (T$_\lambda$) temperature at −105° C., and storage modulus (G') of 1.355×10$^{10}$ dynes/cm$^2$ at 25° C. The polymer exhibited the following mechanical properties at room temperature:

| Mechanical Properties (R.T.) | | ASTM Method |
| --- | --- | --- |
| Tensile Stress[1], psi | 4,298 | D-638-27 |
| , kPa | 29,634 | |
| Flexural Stress[2], psi | 6320 | D-790-27 |
| , kPa | 43,575 | |
| Tensile Modulus[1], psi | 363,600 | D-638-27 |
| , kPa | 2,506,949 | |
| % Elongation[1] | 1.5 | D-638-27 |

[1]average of three samples
[2]average of four samples

The red compression molded polymer was post cured at 270° C. for 24 hours (86,400 s). Thermogravimetric analysis in nitrogen showed 5% weight loss at 495° C. and 35% weight loss at 950° C. The post cured red polymer lost 5% by weight at 500° C. and 70.5% by weight at 700° C. in air.

EXAMPLE 6

Maleic N,N'-4,4'-diphenylmethane-bis-imide (or 1,1'-(methylenedi-4,1-phenylene)bismaleimide) was oven cured under full vacuum at 180° C. and sieved with a U.S.A. Standard Testing Sieve No. 40. The resulting N,N'-bis-imide prepolymer softened between 200°–250° C. 1,1'-(methylenedi-4,1-phenylene)bismaleimide (10 g) and the sieved orange prepolymer described in Example 5 were mixed to give an orange powder. This powder was compression molded between 270°–293° C. and 6200 psi (42,749 kPa) for 2 hours with a Carver Laboratory press as described in Example 4. The infrared spectrum of the molded polymer was nearly the superposition of the infrared spectra of the cured polymer described in Example 5 and the infrared spectra of cured 1,1'-(methylenedi-4,1-phenylene)bismaleimide. The major difference noted was a decrease in the 690 cm$^{-1}$ band with respect to cured 1,1'-(methylenedi-4,1-phenylene)bismaleimide. Dynamic mechanical analyses showed no glass transition temperature up to 400° C., a gamma transition (T$_\lambda$) temperature at −107° C. and storage modulus (G') of 1.152×10$^{10}$ dynes/cm$^2$ at 25° C. Modulus retention at 200° and 300° C. with respect to the storage modulus at 30° C. was 81 and 75%, respectively. Thermogravimetric analysis in nitrogen showed 5% weight loss at 458° C. and 46.5% weight loss at 950° C. In air, the polymer lost 5% weight at 453° C.

EXAMPLE 7

2,3,5,6-Tetramethylpyrazine (554 g, 4.1 moles) and terephthaldicarboxaldehyde (471 g, 3.5 moles) were added to a 2-liter resin kettle equipped with a immersion thermometer, mechanical stirrer, nitrogen purge system and Brookfield viscometer. The reactor contents were heated with stirring. After complete dissolution, sulfuric acid (8.46 g, 0.089 moles) was added to the reactor contents. The temperature was maintained between 155°–179° C. After 1 hour 39 minutes (5940 s) the viscosity reached 500 centipoise. The reactor contents was a wet red-orange solid at room temperature. The solid (204 g) was stirred in methanol (468 g) for an hour (3600 s). The methanolic solution of prepolymer was vacuum filtered. The resultant prepolymer was washed twice with a mixture of 50 volume % methanol and 50 volume % acetone, washed once with methanol and dried for 1 hour 50 minutes (6600 s) at 130° C. and 18 inches vacuum. The dried orange prepolymer was sieved with a U.S.A. Standard Testing Sieve No. 40. The prepolymer soften between 150°–223° C.

EXAMPLE 8

1,1'-(Methylenedi-4,1-phenylene)bismaleimide was oven cured under full vacuum between 113°–150° C. for 1 hour 49 minutes (6540 s) and sieved as described in Example 6. The resulting N,N'-bis-imide prepolymer melted between 146°–150° C. 1,1'-(methylenedi-4,1-phenylene)bismaleimide (12 g) and the orange prepolymer described in Example 7 were mixed to give an orange powder. This powder was compression molded between 187°–192° C. and 4650–5000 psi (32062–34475 kPa) for 2 hours (7200 s) with a Carver Laboratory press as described with Example 4. Dynamic mechanical analyses showed no glass transition temperature up to 400° C., a gamma transition ($T_\lambda$) at $-102°$ C. and storage modulus (G') of $1.362 \times 10^{10}$ dynes/cm$^2$ at 25° C. Thermogravimetric analysis in nitrogen showed 5% weight loss at 412° C. and 51.5% weight loss at 950° C. In air, the polymer lost 5% weight at 412° C. and 97.5% weight at 700° C. in air.

EXAMPLE 9

The sieved orange prepolymer (100 g) described in Example 5 and N-methylpyrrolidinone (100 g) were mixed in a beaker. This solution was painted onto a 14"×14" (35.6×35.6 cm) woven graphite fiber mat (Hercules AP193 dry cloth) clamped to a frame. The graphite fiber mat preimpregnate was allowed to dry over night at room temperature. Then it was dried in an oven under full vacuum between 142°–145° C. for 46 minutes (2760 s). Finally the graphite fiber mat preimpregnate was dried in a convection oven between 175°–182° C. for 68 minutes (4080 s). Six 4"×6" (10.1×15.2 cm) sections were cut from the graphite fiber mat preimpregnate, layed up on top of one another, and then compression molded between 270°–293° C. and 2500–2800 psi (17238–19306 kPa) for 3 hours (10,800 s) with a Carver Laboratory press. Dynamic mechanical analyses showed no glass transition temperature up to 400° C., a gamma transition ($T_\lambda$) temperature at $-102°$ C. and storage modulus (G') of $2.26 \times 10^{10}$ dynes/cm$^2$ at 25° C. Modulus retention at 200° and 300° C. with respect to the storage modulus at 30° C. was 99 and 111%, respectively. Thermogravimetric analysis of the graphite composite in nitrogen showed 5% weight loss at 437° C. and 34% weight loss at 950° C. The composite lost 5% weight at 446° C. and 80% weight at 700° C. in air.

EXAMPLE 10

The sieved orange prepolymer (50 g) described in Example 7 and N-methylpyrrolidinone (50 g) were mixed in a beaker to give an orange paste. The orange paste was warmed and stirred for ten minutes (600 s) and then painted onto a 14"×14" (35.6×35.6 cm) woven graphite fiber mat (Hercules AP193 dry cloth) clamped to a frame. The graphite fiber mat preimpregnate was allowed to dry over night at room temperature. Then it was dried in an oven under full vacuum at 160° C. for 30 minutes (1800 s). Prepolymer scraped off the graphite fiber mat preimpregnate soften between 220°–236° C. Six 4"×6" (10.1×15.2 cm) sections were cut from the graphite fiber mat preimpregnate, layed up on top of one another, and then compression molded between 222°–224° C. and 500–1000 psi (3448–6895 kPa) for 1 hour (3600 s) and at 250° C. and 500 psi (3448 kPa) for 2 hours (7200 s). The finished composite had thoroughly fused giving a flexible sample after trimming.

We claim:

1. A thermosettable product which results from reacting (A) at least one pyrazine compound containing at least two substituent groups which have at least one hydrogen atom attached to a carbon atom which is attached to the ring or mixture of such pyrazines and (B) at least one of (1) at least one material having at least two aldehyde groups or (2) a mixture of (a) at least one aldehyde having at least two aldehyde groups and (b) at least one aldehyde having only one aldehyde group; wherein components (A) and (B) are employed in a mole ratio of (A):(B) of from about 0.25:1 to about 4:1.

2. A product of claim 1 wherein component (A) has two substituent methyl groups and component (B) has two aromatic aldehyde groups.

3. A product of claim 1 wherein component (A) has three substituent methyl groups and component (B) has two aromatic aldehyde groups.

4. A product of claim 1 wherein component (A) has four substituent methyl groups and component (B) has two aromatic aldehyde groups.

5. A product of claim 1 wherein component (A) is 2,5-dimethylpyrazine, 2,3,5-trimethylpyrazine, 2,3,5,6-tetramethylpyrazine or a mixture thereof and component (B) is terephthaldicarboxaldehyde.

6. A product of claim 2 wherein component (A) is 2,5-dimethylpyrazine and component (B) is terephthaldicarboxaldehyde.

7. A product of claim 3 wherein component (A) is 2,3,5-trimethylpyrazine and component (B) is terephthaldicarboxaldehyde.

8. A product of claim 4 wherein component (A) is 2,3,5,6-tetramethylpyrazine and component (B) is terephthaldicarboxaldehyde.

9. A product of claim 1 wherein component (A) has two substituent methyl groups and component (B) is a mixture of at least one material having at least two aromatic aldehyde groups and at least one material having only one aromatic aldehyde group.

10. A product of claim 1 wherein component (A) has three substituent methyl groups and component (B) is a mixture of at least one material having at least two aromatic aldehyde groups and at least one material having only one aromatic aldehyde groups.

11. A product of claim 1 wherein component (A) has four substituent methyl groups and component (B) is a mixture of at least one material having at least two aromatic aldehyde groups and at least one material having only one aromatic aldehyde group.

12. A product of claim 1 wherein component (A) is 2,5-dimethylpyrazine, 2,3,5-trimethylpyrazine, 2,3,5,6-tetramethylpyrazine or a mixture thereof and component (B) is a mixture of terephaldicarboxaldehyde and benzaldehyde.

13. A product of claim 2 wherein component (A) is 2,5-dimethylpyrazine and component (B) is a mixture of terephthaldicarboxaldehyde and benzaldehyde.

14. A product of claim 3 wherein component (A) is 2,3,5-trimethylpyrazine and component (B) is a mixture of terephthaldicarboxaldehyde and benzaldehyde.

15. A product of claim 4 wherein component (A) is 2,3,5,6-tetramethylpyrazine and component (B) is a mixture of terephthaldicarboxaldehyde and benzaldehyde.

16. A product of claims 1, 2, 3, 4, 5, 6, 7, 8, 9, 10, 11, 12, 13, 14 or 15 wherein the mole ratio of components (A) and (B) is from about 1:1 to about 1.5:1.

17. A product resulting from subjecting a composition containing a product of claims 1, 2, 3, 4, 5, 6, 7, 8, 9, 10, 11, 12, 13, 14 or 15 to conditions sufficient to effect curing to a thermoset condition.

18. A product of claim 17 wherein said curing is effected by compression molding at a temperature of from about 150° C. to about 350° C. and a pressure up to about 10,000 psig.

19. A product of claim 17 wherein said composition contains a reinforcing material.

20. A product of claim 19 wherein said reinforcing material is woven, mat, roving or random fibers of natural or synthetic materials.

21. A product of claim 20 wherein said reinforcing material is glass, carbon, graphite or aramid.

22. A product of claim 18 wherein said composition contains a reinforcing material.

23. A product of claim 22 wherein said reinforcing material is woven, mat, roving or random fibers of natural or synthetic materials.

24. A product of claim 23 wherein said reinforcing material is glass, carbon, graphite or aramid.

25. A product resulting from subjecting a composition comprising (A) a N,N'-bis-imide and (B) a product of claims 1, 2, 3, 4, 5, 6, 7, 8, 9, 10, 11, 12, 13, 14 or 15 to conditions sufficient to effect curing to a thermoset condition.

26. A product of claim 25 wherein component (A) is 1,1'-(methylenedi-4,1-phenylene)bismaleimide.

27. A product of claim 25 wherein said composition contains a reinforcing material.

28. A product of claim 27 wherein said reinforcing material is woven, mat, roving or random fibers of natural or synthetic materials.

29. A product of claim 28 wherein said reinforcing material is glass, carbon, graphite or aramid.

30. A product of claim 26 wherein said composition contains a reinforcing material.

31. A product of claim 30 wherein said reinforcing material is woven, mat, roving or random fibers of natural or synthetic materials.

32. A product of claim 31 wherein said reinforcing material is glass, carbon, graphite or aramid.

33. A product resulting from subjecting a composition comprising a product of claim 16 to conditions sufficient to effect curing to a thermoset condition.

34. A product of claim 33 wherein said curing is effected by compression molding at a temperature of from about 150° C. to about 350° C. and a pressure up to about 10,000 psig.

35. A product of claim 33 wherein said composition contains a reinforcing material.

36. A product of claim 35 wherein said reinforcing material is woven, mat, roving or random fibers of natural or synthetic materials.

37. A product of claim 36 wherein said reinforcing material is glass, carbon, graphite or aramid.

38. A product of claim 34 wherein said composition contains a reinforcing material.

39. A product of claim 38 wherein said reinforcing material is woven, mat, roving or random fibers of natural or synthetic materials.

40. A product of claim 39 wherein said reinforcing material is glass, carbon, graphite or aramid.

41. A product resulting from subjecting a composition comprising (A) at least one bisimide and (B) at least one product of claim 16 to conditions sufficient to effect curing to a thermoset condition.

42. A product of claim 41 wherein component (A) is 1,1'-(methylenedi-4,1-phenylene)bismaleimide.

43. A product of claim 41 wherein said composition contains a reinforcing material.

44. A product of claim 43 wherein said reinforcing material is woven, mat, roving or random fibers of natural or synthetic materials.

45. A product of claim 44 wherein said reinforcing material is glass, carbon, graphite or aramid.

46. A product of claim 42 wherein said composition contains a reinforcing material.

47. A product of claim 46 wherein said reinforcing material is woven, mat, roving or random fibers of natural or synthetic materials.

48. A product of claim 47 wherein said reinforcing material is glass, carbon, graphite or aramid.

49. A thermosettable product which results from reacting a pyrazine containing both methyl and aldehyde groups with itself.

50. A product of claim 49 wherein the reactant is 2-methyl-5-pyrazinecarboxaldehyde.

51. A product of claim 49 wherein the reactant is 2,3-dimethyl-5,6-pyrazinedicarboxaldehyde.

52. A product resulting from subjecting a composition containing a product of claims 49, 50 or 51 to conditions sufficient to effect curing thereof to a thermoset product.

53. A product of claim 52 wherein said composition contains a reinforcing material.

54. A product of claim 53 wherein said reinforcing material is woven, mat, roving or random fibers of natural or synthetic materials.

55. A product of claim 54 wherein said reinforcing material is glass, carbon, graphite or aramid.

56. A product of claim 52 wherein said curing is effected by compression molding at a temperature of from about 150° C. to about 350° C. and a pressure up to about 10,000 psig.

57. A product of claim 56 wherein said composition contains a reinforcing material.

58. A product of claim 57 wherein said reinforcing material is woven, mat, roving or random fibers of natural or synthetic materials.

59. A product of claim 58 wherein said reinforcing material is glass, carbon, graphite or aramid.

60. A product resulting from subjecting a composition comprising (A) a N,N'-bis-imide and (B) a product of claims 49, 50 or 51 to condition sufficient to effect curing to a thermoset condition.

61. A product of claim 60 wherein component (A) is 1,1'-(methylenedi-4,1-phenylene)bismaleimide.

62. A product of claim 60 wherein said composition contains a reinforcing material.

63. A product of claim 62 wherein said reinforcing material is woven, mat, roving or random fibers of natural or synthetic materials.

64. A product of claim 63 wherein said reinforcing material is glass, carbon, graphite or aramid.

65. A product of claim 61 wherein said composition contains a reinforcing material.

66. A product of claim 65 wherein said reinforcing material is woven, mat, roving or random fibers of natural or synthetic materials.

67. A product of claim 66 wherein said reinforcing material is glass, carbon, graphite or aramid.

68. A thermosettable product which results from reacting (A) a pyrazole, imidazole, pyridazine, pyrimidine, purine, pteridine, triazine, quinoline or quinoxaline compound or a mixture of any two or more such compounds having at least one substituent group which has a hydrogen atom attached to a carbon atom which is attached to the ring with the proviso that at least one of such pyrazole, imidazole, pyridazine, pyrimidine, purine, pteridine, triazine, quinoline or quinoxaline compounds has at least two substituent groups which have a hydrogen atom attached to a carbon atom which is attached to the ring with (B) at least one of (1) at least one material having at least two aldehyde groups or (2) a mixture of (a) at least one aldehyde having at least two aldehyde groups and (b) at least one aldehyde having only one aldehyde group; wherein components (A) and (B) are employed in a mole ratio of (A):(B) of from about 0.25:1 to about 4:1.

69. A thermosettable product of claim 68 wherein the mole ratio of (A):(B) is from about 1:1 to about 1.5:1.

70. A product resulting from subjecting a composition containing a product of claims 68 or 69 to conditions sufficient to effect curing to a thermoset condition.

71. A product of claim 70 wherein said composition contains a reinforcing material.

72. A product of claim 71 wherein said reinforcing material is woven, mat, roving or random fibers of natural or synthetic materials.

73. A product of claim 72 wherein said reinforcing material is glass, carbon, graphite or aramid.

74. A product of claim 70 wherein said curing is effected by compression molding at a temperature of from about 150° C. to about 350° C. and a pressure up to about 10,000 psig.

75. A product of claim 74 wherein said composition contains a reinforcing material.

76. A product of claim 75 wherein said reinforcing material is woven, mat, roving or random fibers of natural or synthetic materials.

77. A product of claim 76 wherein said reinforcing material is glass, carbon, graphite or aramid.

78. A product resulting from subjecting a composition comprising (A) a N,N'-bis-imide and (B) a product of claims 68 or 69 to conditions sufficient to effect curing to a thermoset condition.

79. A product of claim 78 wherein component (A) is 1,1'-(methylenedi-4,1-phenylene)bismaleimide.

80. A product of claim 78 wherein said composition contains a reinforcing material.

81. A product of claim 80 wherein said reinforcing material is woven, mat, roving or random fibers of natural or synthetic materials.

82. A product of claim 81 wherein said reinforcing material is glass, carbon, graphite or aramid.

83. A product of claim 79 wherein said composition contains a reinforcing material.

84. A product of claim 83 wherein said reinforcing material is woven, mat, roving or random fibers of natural or synthetic materials.

85. A product of claim 84 wherein said reinforcing material is glass, carbon, graphite or aramid.

86. A thermosettable product resulting from reacting (A) a mixture of (1) at least one pyrazine compound having at least one substituent group which has a methyl group attached to a carbon atom which is attached to the ring and (2) at least one of pyrazole, imidazole, pyridazine, pyrimidine, purine, pteridine, triazine, quinoline or quinoxaline compounds having at least one substituent group which has a methyl group attached to a carbon atom which is attached to the ring with (B) at least one of (1) at least one material having at least two aldehyde groups or (2) a mixture of (a) at least one aldehyde having at least two aldehyde groups and (b) at least one aldehyde having only one aldehyde group; wherein a majority of the compounds of component (A) have at least two substituent methyl groups and components (A) and (B) are employed in quantities which provide a mole ratio of (A):(B) of from about 0.25:1 to about 4:1.

87. A thermosettable product of claim 86 wherein the mole ratio of (A):(B) is from about 1:1 to about 1.5:1.

88. A product resulting from subjecting a composition containing a product of claims 86 or 87 to conditions sufficient to effect curing thereof to a thermoset product.

89. A product of claim 88 wherein said composition contains a reinforcing material.

90. A product of claim 89 wherein said reinforcing material is woven, mat, roving or random fibers of natural or synthetic materials.

91. A product of claim 90 wherein said reinforcing material is glass, carbon, graphite or aramid.

92. A product of claim 88 wherein said curing is effected by compression molding at a temperature of from about 150° C. to about 350° C. and a pressure up to about 10,000 psig.

93. A product of claim 92 wherein said composition contains a reinforcing material.

94. A product of claim 93 wherein said reinforcing material is woven, mat, roving or random fibers of natural or synthetic materials.

95. A product of claim 94 wherein said reinforcing material is glass, carbon, graphite or aramid.

96. A product resulting from subjecting a composition comprising (A) a N,N'-bis-imide and (B) a product of claims 86 or 87 to conditions sufficient to effect curing to a thermoset condition.

97. A product of claim 96 wherein component (A) is 1,1'-(methylenedi-4,1-phenylene)bismaleimide.

98. A product of claim 96 wherein said composition contains a reinforcing material.

99. A product of claim 98 wherein said reinforcing material is woven, mat, roving or random fibers of natural or synthetic materials.

100. A product of claim 99 wherein said reinforcing material is glass, carbon, graphite or aramid.

101. A product of claim 97 wherein said composition contains a reinforcing material.

102. A product of claim 101 wherein said reinforcing material is woven, mat, roving or random fibers of natural or synthetic materials.

103. A product of claim 102 wherein said reinforcing material is glass, carbon, graphite or aramid.

104. A thermosettable product which results from reacting (A) a mixture of pyrazine and pyridine having at least one substituent group which has a hydrogen atom attached to a carbon atom which is attached to the ring to act as a chain terminator, with the proviso that the majority of such pyrazine or pyridine compounds have at least two substituent groups which have a hydrogen atom attached to a carbon atom which is attached to the ring with (B) at least one of (1) at least one material having at least two aldehyde groups or (2) a mixture of (a) at least one aldehyde having at least two aldehyde groups and (b) at least one aldehyde having only one aldehyde group; wherein components (A) and (B) are employed in a mole ratio of (A):(B) of from about 0.25:1 to about 4:1.

105. A thermosettable compound of claim 104 wherein the mole ratio of (A):(B) is from about 1:1 to about 1.5:1.

106. A product resulting from subjecting a composition containing a product of claims 104 or 105 to conditions sufficient to effect curing thereof to a thermoset product.

107. A product of claim 106 wherein said composition contains a reinforcing material.

108. A product of claim 107 wherein said reinforcing material is woven, mat, roving or random fibers of natural or synthetic materials.

109. A product of claim 108 wherein said reinforcing material is glass, carbon, graphite or aramid.

110. A product of claim 106 wherein said curing is effected by compression molding at a temperature of from about 150° C. to about 350° C. and a pressure up to about 10,000 psig.

111. A product of claim 110 wherein said composition contains a reinforcing material.

112. A product of claim 111 wherein said reinforcing material is woven, mat, roving or random fibers of natural or synthetic materials.

113. A product of claim 112 wherein said reinforcing material is glass, carbon, graphite or aramid.

114. A product resulting from subjecting a composition comprising (A) a N,N'-bis-imide and (B) a product of claims 104 or 105 to conditions sufficient to effect curing to a thermoset condition.

115. A product of claim 114 wherein component (A) is 1,1'-(methylenedi-4,1-phenylene)bismaleimide.

116. A product of claim 114 wherein said composition contains a reinforcing material.

117. A product of claim 116 wherein said reinforcing material is woven, mat, roving or random fibers of natural or synthetic materials.

118. A product of claim 117 wherein said reinforcing material is glass, carbon, graphite or aramid.

119. A product of claim 115 wherein said composition contains a reinforcing material.

120. A product of claim 119 wherein said reinforcing material is woven, mat, roving or random fibers of natural or synthetic materials.

121. A product of claim 120 wherein said reinforcing material is glass, carbon, graphite or aramid.

122. A thermosettable product which results from reacting a pyridine, pyrazole, imidazole, pyridazine, pyrimidine, purine, pteridine, triazine, quinoline or quinoxaline compound or a mixture of any two or more such compounds having both at least one group which has a hydrogen atom attached to a carbon atom which is attached to the ring and at least one aldehyde group with itself or themselves.

123. A product resulting from subjecting a composition containing a product of claim 122 to conditions sufficient to effect curing thereof to a thermoset condition.

124. A product of claim 123 wherein said composition contains a reinforcing material.

125. A product of claim 124 wherein said reinforcing material is woven, mat, roving or random fibers of natural or synthetic materials.

126. A product of claim 125 wherein said reinforcing material is glass, carbon, graphite or aramid.

127. A product of claim 123 wherein said curing is effected by compression molding at a temperature of from about 150° C. to about 350° C. and a pressure up to about 10,000 psig.

128. A product of claim 127 wherein said composition contains a reinforcing material.

129. A product of claim 128 wherein said reinforcing material is woven, mat, roving or random fibers of natural or synthetic materials.

130. A product of claim 129 wherein said reinforcing material is glass, carbon, graphite or aramid.

131. A product resulting from subjecting a composition comprising (A) at least one N,N'-bis-imide and (B) a product of claim 122 to conditions sufficient to effect curing to a thermoset condition.

132. A product of claim 131 wherein component (A) is 1,1'-(methylenedi-4,1-phenylene)bismaleimide.

133. A product of claim 131 wherein said composition contains a reinforcing material.

134. A product of claim 133 wherein said reinforcing material is woven, mat, roving or random fibers of natural or synthetic materials.

135. A product of claim 134 wherein said reinforcing material is glass, carbon, graphite or aramid.

136. A product of claim 132 wherein said composition contains a reinforcing material.

137. A product of claim 136 wherein said reinforcing material is woven, mat, roving or random fibers of natural or synthetic materials.

138. A product of claim 137 wherein said reinforcing material is glass, carbon, graphite or aramid.

139. A thermosettable product which results from reacting (A) at least one pyrazine compound having at least one methyl group and at least one aldehyde group with (B) at least one of pyridine, pyrazole, imidazole, pyridazine, pyrimidine, purine, pteridine, triazine, quinoline or quinoxaline compounds having at least one methyl group and at least one aldehyde group.

140. A product resulting from subjecting a composition containing a product of claim 139 to conditions sufficient to effect curing thereof to a thermoset condition.

141. A thermosettable product which results from reacting (A) a pyrazine, pyrazole, imidazole, pyridazine, pyrimidine, purine, pteridine, triazine, quinoline or quinoxaline compound or a mixture of any two or more such compounds or a mixture of pyridine and any one or more of such compounds each such compounds and pyridine having at least one substituent group which has a hydrogen atom attached to a carbon atom which is attached to the ring with the proviso that at least one of such pyrazine, pyridine, pyrazole, imidazole, pyridazine, pyrimidine, purine, pteridine, triazine, quinoline or quinoxaline compounds has at least two substituent groups which have a hydrogen atom attached to a carbon atom which is attached to the ring with (B) at least one of (1) at least one material having at least two aldehyde groups or (2) a mixture of (a) at least one aldehyde having at least two aldehyde groups and (b) at least one aldehyde having only one aldehyde group; wherein components (A) and (B) are employed in a mole ratio of (A):(B) of from about 0.25:1 to about 4:1.

142. A thermosettable product of claim 141 wherein the mole ratio of (A):(B) is from about 1:1 to about 1.5:1.

143. A product of claim 142 wherein component (B) is glyoxal.

144. A product resulting from subjecting a composition containing a product of claims 141, 142 or 143 to conditions sufficient to effect curing thereof.

145. A product of claim 144 wherein said composition contains a reinforcing material.

146. A product of claim 145 wherein said reinforcing material is woven, mat, roving or random fibers of natural or synthetic materials.

147. A product of claim 146 wherein said reinforcing material is glass, carbon, graphite or aramid.

148. A product resulting from subjecting a composition containing a product of claim 143 to conditions sufficient to effect curing thereof.

149. A product of claim 148 wherein said composition contains a reinforcing material.

150. A product of claim 149 wherein said reinforcing material is woven, mat, roving or random fibers of natural or synthetic materials.

151. A product of claim 150 wherein said reinforcing material is glass, carbon, graphite or aramid.

152. A product of claim 144 wherein said curing is effected by compression molding at a temperature of from about 150° C. to about 350° C. and a pressure up to about 10,000 psig.

153. A product of claim 152 wherein said composition contains a reinforcing material.

154. A product of claim 153 wherein said reinforcing material is woven, mat, roving or random fibers of natural or synthetic materials.

155. A product of claim 154 wherein said reinforcing material is glass, carbon, graphite or aramid.

156. A product of claim 148 wherein said curing is effected by compression molding at a temperature of from about 150° C. to about 350° C. and a pressure up to about 10,000 psig.

157. A Product of claim 156 wherein said composition contains a reinforcing material.

158. A product of claim 157 wherein said reinforcing material is woven, mat, roving or random fibers of natural or synthetic materials.

159. A product of claim 158 wherein said reinforcing material is glass, carbon, graphite or aramid.

160. A product resulting from subjecting a composition comprising (A) at least one N,N'-bis-imide and (B) at least one product of claims 141 or 142 to conditions sufficient to effect curing to a thermoset condition.

161. A product of claim 160 wherein component (A) is 1,1'-(methylenedi-4,1-phenylene)bismaleimide.

162. A product of claim 160 wherein said composition contains a reinforcing material.

163. A product of claim 162 wherein said reinforcing material is woven, mat, roving or random fibers of natural or synthetic materials.

164. A product of claim 163 wherein said reinforcing material is glass, carbon, graphite or aramid.

165. A product of claim 161 wherein said composition contains a reinforcing material.

166. A product of claim 165 wherein said reinforcing material is woven, mat, roving or random fibers of natural or synthetic materials.

167. A product of claim 166 wherein said reinforcing material is glass, carbon, graphite or aramid.

168. A product resulting from subjecting a composition comprising (A) at least one N,N'-bis-imide and (B) at least one product of claims 141, 142 or 143 to conditions sufficient to effect curing to a thermoset condition.

169. A product of claim 168 wherein component (A) is 1,1'-(methylene-4,1-phenylene)bismaleimide.

170. A product of claim 168 wherein said composition contains a reinforcing material.

171. A product of claim 170 wherein said reinforcing material is woven, mat, roving or random fibers of natural or synthetic materials.

172. A product of claim 171 wherein said reinforcing material is glass, carbon, graphite or aramid.

173. A product of claim 168 wherein said curing is effected by compression molding at a temperature of from about 150° C. to about 350° C. and a pressure up to about 10,000 psig.

174. A product of claim 173 wherein said composition contains a reinforcing material.

175. A product of claim 174 wherein said reinforcing material is woven, mat, roving or random fibers of natural or synthetic materials.

176. A product of claim 175 wherein said reinforcing material is glass, carbon, graphite or aramid.

177. A product of claim 169 wherein said composition contains a reinforcing material.

178. A product of claim 177 wherein said reinforcing material is woven, mat, roving or random fibers of natural or synthetic materials.

179. A product of claim 178 wherein said reinforcing material is glass, carbon, graphite or aramid.

180. A product of claim 169 wherein said curing is effected by compression molding at a temperature of from about 150° C. to about 350° C. and a pressure up to about 10,000 psig.

181. A product of claim 180 wherein said composition contains a reinforcing material.

182. A product of claim 181 wherein said reinforcing material is woven, mat, roving or random fibers of natural or synthetic materials.

183. A product of claim 182 wherein said reinforcing material is glass, carbon, graphite or aramid.

* * * * *